United States Patent
Dowdell et al.

(10) Patent No.: US 10,822,996 B2
(45) Date of Patent: Nov. 3, 2020

(54) GAS TURBINE ENGINE HEALTH DETERMINATION

(71) Applicant: General Electric Company, Schenectady, NY (US)

(72) Inventors: Charles William Dowdell, Ipswich, MA (US); Jacques Paul, Somerville, MA (US); Paul J. Morrison, Piedmont, CA (US)

(73) Assignee: General Electric Company, Schenectady, NY (US)

(*) Notice: Subject to any disclaimer, the term of this patent is extended or adjusted under 35 U.S.C. 154(b) by 225 days.

(21) Appl. No.: 15/918,266

(22) Filed: Mar. 12, 2018

(65) Prior Publication Data

US 2019/0277155 A1 Sep. 12, 2019

(51) Int. Cl.
*F02D 21/00* (2006.01)
*F01D 21/00* (2006.01)
(Continued)

(52) U.S. Cl.
CPC ........... *F01D 21/003* (2013.01); *B64D 45/00* (2013.01); *F02C 9/18* (2013.01);
(Continued)

(58) Field of Classification Search
CPC ............ B64D 45/00; B64D 2045/0085; F01D 21/003; F02C 9/18; F02C 9/16;
(Continued)

(56) References Cited

U.S. PATENT DOCUMENTS 4,296,601 A * 10/1981 Martin .................... F02C 9/28
60/224
5,050,081 A 9/1991 Abbott et al.
(Continued)

FOREIGN PATENT DOCUMENTS

CN 110254746 A * 9/2019 ........... F01D 21/003

OTHER PUBLICATIONS

Active control of surge in an aircraft compressor; M. Montazeri-Gh et al.; UKACC International Conference on Control '96 (Conf. Publ. No. 427); Conference Paper; Publisher: IET (Year: 2018).*
(Continued)

*Primary Examiner* — Cuong H Nguyen
(74) *Attorney, Agent, or Firm* — Dority & Manning, P.A.

(57) ABSTRACT

A method for determining an engine heath of an aircraft engine includes determining, by one or more control devices, the aircraft engine is operating in a bleed off condition; determining, by the one or more control devices, a first engine health modifier value while the aircraft engine is operating in the bleed off condition, the first of engine health modifier value including a compressor leakage flow value; determining, by the one or more control devices, a second plurality of engine health modifier values while the aircraft engine is operating in a bleed on condition; and determining, by the one or more control devices, an engine health parameter using at least one of the second plurality of engine health modifier values determined while the aircraft engine is operating in the bleed on condition and the compressor leakage flow value determined while the aircraft engine was operating in the bleed off condition.

20 Claims, 6 Drawing Sheets

(51) Int. Cl.
  *B64D 45/00* (2006.01)
  *F02C 9/18* (2006.01)
(52) U.S. Cl.
  CPC ............ *B64D 2045/0085* (2013.01); *F05D 2220/323* (2013.01); *F05D 2260/80* (2013.01); *F05D 2260/81* (2013.01); *F05D 2260/83* (2013.01); *F05D 2270/3011* (2013.01); *F05D 2270/311* (2013.01); *F05D 2270/312* (2013.01); *F05D 2270/313* (2013.01)
(58) Field of Classification Search
  CPC ...... F02C 9/20; F02C 9/22; F02C 9/24; F05D 2260/81; F05D 2260/83; F05D 2270/313; F05D 2270/3011; F05D 2220/329; F05D 2260/80; F05D 2270/311; F05D 2270/312; F05D 2220/323
  USPC .................. 60/773, 782, 785, 774; 701/100
  See application file for complete search history.

(56) References Cited

U.S. PATENT DOCUMENTS

| | | | | |
|---|---|---|---|---|
| 5,174,105 | A * | 12/1992 | Hines | F02C 3/10 60/774 |
| 6,357,219 | B1 * | 3/2002 | Dudd, Jr. | F02C 7/26 60/39.281 |
| 8,306,791 | B2 | 11/2012 | Yerramalla et al. | |
| 9,310,276 | B2 | 4/2016 | Gaully et al. | |
| 9,382,010 | B2 * | 7/2016 | Chen | G05B 13/024 |
| 9,732,625 | B2 | 8/2017 | Cai | |
| 9,759,132 | B2 * | 9/2017 | Khalid | F02C 9/00 |
| 10,072,585 | B2 * | 9/2018 | Mosley | F02C 9/18 |
| 10,280,788 | B2 * | 5/2019 | Chen | F01D 21/003 |
| 2010/0168982 | A1 * | 7/2010 | Maalioune | F02K 1/72 701/100 |
| 2010/0241331 | A1 * | 9/2010 | Duke | F01D 25/18 701/100 |
| 2012/0167587 | A1 * | 7/2012 | Clark | F02C 9/18 60/782 |
| 2014/0297053 | A1 | 10/2014 | Morgan et al. | |
| 2015/0378334 | A1 | 12/2015 | Karpman et al. | |
| 2016/0003166 | A1 * | 1/2016 | Mosley | F02C 7/18 416/95 |
| 2017/0036773 | A1 | 2/2017 | Jones et al. | |
| 2019/0277155 | A1 * | 9/2019 | Dowdell | B64D 45/00 |

OTHER PUBLICATIONS

Influence of geometrical parameters on dust removal performance of cyclone dust collector for bleed air system of ECS Li Chaofei et al.; CSAA/IET International Conference on Aircraft Utility Systems (AUS 2018); Conference Paper; Publisher: IET (Year: 2018).*
A novel anti/de-icing system combining heat expansion film and electric heating for helicopter rotor Long Chen et al.; 2017 IEEE 2nd Advanced Information Technology, Electronic and Automation Control Conference (IAEAC); Conference Paper; Publisher: IEEE (Year: 2017).*
Auxiliary Power Unit—System Essentials; M. Hovanec et al.; 2019 New Trends in Aviation Development (NTAD); Year: 2019 | Conference Paper | Publisher: IEEE (Year: 2019).*
Model Development for Active Surge Control/Rotating Stall Avoidance in Aircraft Gas Turbine Engines K. M. Eveker ; C. N. Nett;1991 American Control Conference; Conference Paper | Publisher: IEEE (Year: 1991).*
Air turbine drives Performance and limitations; L. Royce, Jan. 1956, pp. 461-467.*

* cited by examiner

GAS TURBINE ENGINE HEALTH DETERMINATION

FEDERALLY SPONSORED RESEARCH

This invention was made with government support under contract number W58RGZ-16-C-0047 of the U.S. Department of Defense. The government may have certain rights in the invention.

FIELD

The present subject matter relates generally to a system and method for determining a health of a gas turbine engine, or more particularly to a method for determining a health factor of a gas turbine engine.

BACKGROUND

An aircraft turbine engine generally includes a core having, in serial flow order, a compressor section, a combustion section, a turbine section, and an exhaust section. One or more shafts may be provided to drivingly connect the turbine section to the compressor section, and optionally, to drivingly connect the turbine section to a load. When such an aircraft engine is incorporated into a rotary wing aircraft, such as a helicopter, the one or more shafts of the aircraft engine may be mechanically coupled to a main rotor of the rotary wing aircraft such that the main rotor may provide lift for the rotary wing aircraft.

Given the nature of air travel, it is generally desirable to ensure the aircraft engine is operating properly before and/or during flight, and to maintain or overhaul such aircraft engines before the aircraft engine degrades past a certain threshold. One measure of degradation of an aircraft engine is an engine torque factor of the engine. The engine torque factor generally refers to a ratio of a current maximum corrected torque available to a maximum corrected torque available to a reference engine (e.g., of a specification engine). When the engine torque factor drops below a certain threshold, it may be determined that the engine needs to be taken "off wing" and maintained or overhauled.

One way for determining an engine torque factor is by utilizing one or more baseline engine thermodynamics models and providing a variety of current engine health modifier values to "tune" the baseline engine thermodynamics model to the specific engine being assessed. However, such systems require real-time compressor bleed airflow values in order to accurately determine the engine torque factor. Accordingly, such systems require sensors (and associated hardware) for sensing such compressor bleed airflow, and/or complicated algorithms to predict the real-time compressor bleed airflow values.

Such systems and methods may therefore undesirably require additional components and/or computing power in order to determine the engine torque factor. Further, utilizing the relatively complicated algorithms to predict the real-time compressor bleed airflow values can be inaccurate. Therefore, an improved method for determining an engine torque factor specific to the particular aircraft engine would be useful. Further, a method for determining an engine torque factor capable of taking into consideration certain operating conditions and/or ambient conditions of the aircraft engine would be particularly beneficial.

BRIEF DESCRIPTION

Aspects and advantages of the invention will be set forth in part in the following description, or may be obvious from the description, or may be learned through practice of the invention.

In one exemplary aspect of the present disclosure, a method for determining an engine heath of an aircraft engine is provided. The method includes determining, by one or more control devices, the aircraft engine is operating in a bleed off condition; determining, by the one or more control devices, a first engine health modifier value while the aircraft engine is operating in the bleed off condition, the first of engine health modifier value including a compressor leakage flow value; determining, by the one or more control devices, a second plurality of engine health modifier values while the aircraft engine is operating in a bleed on condition; and determining, by the one or more control devices, an engine health parameter using at least one of the second plurality of engine health modifier values determined while the aircraft engine is operating in the bleed on condition and the compressor leakage flow value determined while the aircraft engine was operating in the bleed off condition.

In one exemplary aspect determining, by the one or more control devices, the engine health parameter includes determining, by the one or more control devices, the engine health parameter using a component level engine model tuned using at least one of the second plurality of engine health modifier values and the compressor leakage flow value determined while the aircraft engine was operating in the bleed off condition.

In one exemplary aspect determining, by the one or more control devices, the first engine health modifier value includes receiving, by the one or more control devices, data indicative of the first engine health modifier value from one or more sensors.

In one exemplary aspect determining, by the one or more control devices, the second plurality of engine health modifier values includes receiving, by the one or more control devices, data indicative of the second plurality of engine health modifier values from one or more sensors.

In one exemplary aspect the first engine health modifier value is one of a first plurality of engine health modifier values, and wherein the first plurality of engine health modifier values additionally includes a first compressor component efficiency value and a first compressor flow scaler value.

In one exemplary aspect the second plurality of engine health modifier values includes a second compressor component efficiency value and a second compressor flow scaler value.

For example, in certain exemplary aspects determining, by the one or more control devices, the engine health parameter includes determining, by the one or more control devices, the engine health parameter using the second compressor component efficiency value, the second compressor flow scaler value, and the compressor leakage flow value determined while the aircraft engine was operating in the bleed off condition.

In one exemplary aspect the bleed on condition is a flight operating condition of the aircraft engine.

For example, in certain exemplary aspects determining, by the one or more control devices, the engine health parameter includes determining, by the one or more control devices, the engine health parameter continuously during the flight operating condition.

In one exemplary aspect determining, by the one or more computing devices, the engine health parameter includes determining, by the one or more computing devices, an engine performance factor for the aircraft engine.

In one exemplary aspect determining, by the one or more computing devices, the engine health parameter further includes receiving, by the one or more computing devices, data indicative of an operating condition of the aircraft engine while the aircraft engine is operating in the bleed on condition; and determining, by the one or more computing devices, the engine health parameter further using the received data indicative of the operating condition of the aircraft engine while the aircraft engine is operating in the bleed on condition.

For example, in certain exemplary aspects the data indicative of the operating condition of the aircraft engine includes data indicative of a fuel flow to a combustion section of the aircraft engine, data indicative of one or more ambient conditions of the aircraft engine, or both.

In certain exemplary aspects, the method further includes determining, by the one or more computing devices, the aircraft engine is operating in the bleed on condition.

In one exemplary aspect the aircraft engine is a turboshaft engine for a helicopter.

In certain exemplary aspects, the method further includes providing, by the one or more computing devices, data to an operator indicative of the determined engine health parameter.

In certain exemplary aspects, the method further includes controlling, by the one or more computing devices, the aircraft engine based at least in part on the determined engine health parameter.

In one exemplary embodiment, a computing device is provided. The computing device includes one or more processors and at least one tangible non-transitory computer-readable medium, the computer-readable medium storing instructions that when executed by the processor perform operations. The operations include determining the aircraft engine is operating in a bleed off condition; determining a first engine health modifier value while the aircraft engine is operating in the bleed off condition, the first of engine health modifier value including a compressor leakage flow value; determining a second plurality of engine health modifier values while the aircraft engine is operating in a bleed on condition; and determining an engine health parameter using at least one of the second plurality of engine health modifier values determined while the aircraft engine is operating in the bleed on condition and the compressor leakage flow value determined while the aircraft engine was operating in the bleed off condition.

In one exemplary embodiment determining the engine health parameter includes determining the engine health parameter using a component level engine model tuned using at least one of the second plurality of engine health modifier values and the compressor leakage flow value determined while the aircraft engine was operating in the bleed off condition.

In one exemplary embodiment determining the first engine health modifier value includes receiving data indicative of the first engine health modifier value from one or more sensors.

In one exemplary embodiment determining the second plurality of engine health modifier values includes receiving data indicative of the second plurality of engine health modifier values from one or more sensors.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
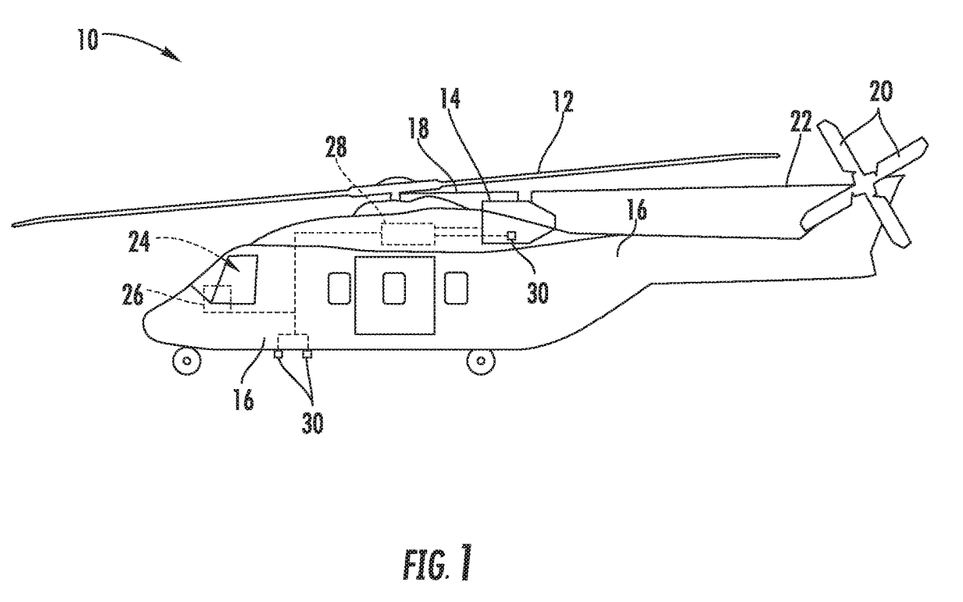
FIG. 1 is a side view of an aircraft according to an exemplary embodiment of the present disclosure.

Referring now to the drawings, wherein identical numerals indicate the same elements throughout the figures, FIG. 1 depicts an aircraft, or more particularly, a rotary wing aircraft 10, also referred to as a helicopter, in accordance with an exemplary embodiment of the present disclosure.

The aircraft 10 depicted includes a main rotor 12 configured to generate lift for driving the aircraft (i.e., helicopter) 10. The main rotor 12 is driven by an engine 14, which is mounted on an engine mount (not shown) on a fuselage 16 of the aircraft 10. As will be discussed in greater detail below, the engine 14 is configured as a gas turbine engine, or more particularly, as a turboshaft engine. The engine 14 is configured to drive the rotor 12 through a drive shaft 18.

Turning the main rotor 12 generates the lift for driving the aircraft 10. In addition, however, the main rotor 12 also applies a reverse torque that spins helicopter fuselage 16 in an opposite direction relative to a direction of rotation of the rotor 12. In certain embodiments, a tail rotor 20 is mounted at the rear of the aircraft 10 for counter-acting the torque generated by the rotor 12. For the embodiment depicted, a portion of the engine 14 power is also utilized to drive the tail rotor 20 through a drive shaft 22.

A cockpit 24—located at a forward end of the fuselage 16 of the aircraft 10—is provided for housing one or more pilots or other aircrew members of the aircraft 10. The one or more aircrew members may manipulate a plurality of controls 26 within the cockpit 24 to operate the aircraft 10 and/or engine 14. The controls 26 may include, e.g., one or more pedals, control sticks, levers, etc. Moreover, the cockpit 24 may also include gauges or other displays to provide the one or more aircrew members with information regarding the aircraft 10 and/or engine 14. For the embodiment depicted, control of one or more aspects of the aircraft 10 may be assisted by a controller 28 (see also FIG. 6). The controller 28 may be operably connected to, e.g., the controls 26 located within the cockpit 24 of the aircraft 10, as well as to a plurality of sensors 30 in/on the engine 14 and aircraft 10. The plurality of sensors 30 may include, e.g., ambient conditions sensors, such as temperature, pressure, and altitude sensors, as well as engine condition sensors for sensing one or more conditions of the engine 14.

Figure 2:
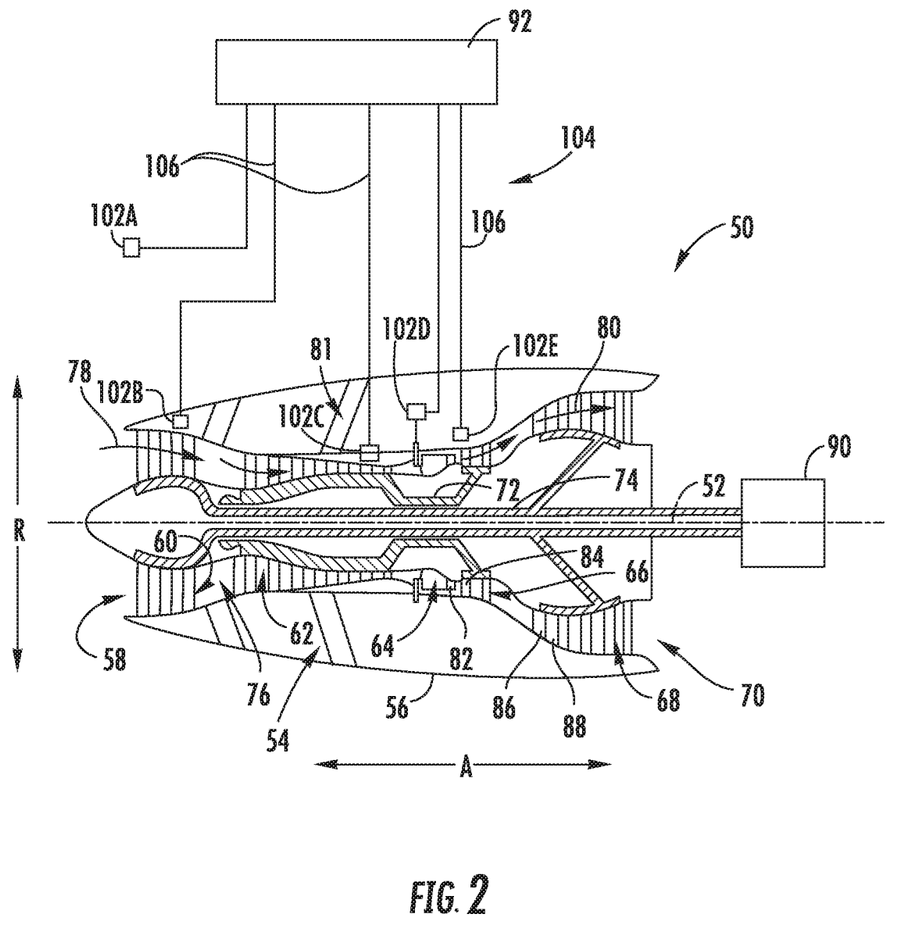
FIG. 2 is a schematic cross-sectional view of an exemplary gas turbine engine according to an exemplary embodiment of the present disclosure.

Referring now to FIG. 2, a schematic cross-sectional view of a gas turbine engine in accordance with an exemplary embodiment of the present disclosure is provided. More particularly, for the embodiment of FIG. 2, the gas turbine engine is a turboshaft engine 50, referred to herein as "turboshaft engine 50." In at least certain exemplary embodiments, the turboshaft engine 50 depicted in FIG. 2 may be incorporated into the aircraft 10 described above with reference to FIG. 1 as the exemplary engine 14. Alternatively, however, the turboshaft engine 50 may be incorporated into any other suitable aircraft.

As shown in FIG. 2, the turboshaft engine 50 defines an axial direction A (extending parallel to a longitudinal centerline 52 provided for reference) and a radial direction R. In general, the turboshaft engine 50 includes a core turbine engine 54 disposed inside a substantially tubular outer casing 56 that defines an annular inlet 58. The outer casing 56 encases, in serial flow relationship, a compressor section including a booster or low pressure (LP) compressor 60 and a high pressure (HP) compressor 62; a combustion section 64; a turbine section including a high pressure (HP) turbine 66 and a low pressure (LP) turbine 68; and an exhaust section 70. A high pressure (HP) shaft or spool 72 drivingly connects the HP turbine 66 to the HP compressor 62. A low pressure (LP) shaft or spool 74 drivingly connects the LP turbine 68 to the LP compressor 60. The compressor section, combustion section 64, turbine section, and nozzle section 70 together define a core air flowpath 76.

During operation of the turboshaft engine 50, a volume of air 78 enters the core air flowpath 76 through the inlet 58, and is provided to the LP compressor 60. A pressure of the air 78 is increased as it is routed through LP compressor 60 and the HP compressor 62. The air 78 exits the HP compressor 62 and flows into the combustion section 64, where the high-pressure air 78 is mixed with fuel and burned to provide combustion gases 80. Alternatively, as is depicted, at least a portion of the air 78 in the compressor section may flow through one or more bleed passages 81. For the embodiment depicted, the bleed passages 81 are located downstream from the LP compressor 60 and upstream from the HP compressor 62. However, in other exemplary embodiments, the bleed passages 81 may additionally, or alternatively, be located at any other suitable location within the turboshaft engine 50.

The combustion gases 80 are then routed through a turbine inlet into the HP turbine 80 where a portion of thermal and/or kinetic energy from the combustion gases 80 is extracted via sequential stages of HP turbine stator vanes 82 that are coupled to the outer casing 56 and HP turbine rotor blades 84 that are coupled to the HP shaft or spool 72. Such a configuration causes the HP shaft or spool 72 to rotate, thereby supporting operation of the HP compressor 62. The combustion gases 80 are then routed through the LP turbine 68 where a second portion of thermal and kinetic energy is extracted from the combustion gases 80 via sequential stages of LP turbine stator vanes 86 that are coupled to the outer casing 56 and LP turbine rotor blades 88 that are coupled to the LP shaft or spool 74. Such a configuration causes the LP shaft or spool 74 to rotate, thereby supporting operation of the LP compressor 60. The combustion gases 80 are subsequently routed through the exhaust section 70.

As is also depicted, the LP shaft 74 extends aft of the core 54 to provide rotational power to a load 90. For example, in certain exemplary aspects, the load 90 may be a main rotor 12 of an aircraft 10 and/or a tail rotor 22 of an aircraft (see FIG. 1) mechanically coupled via one or more driveshafts, gearboxes, etc.

It will also be appreciated that the exemplary turboshaft engine 50 depicted in FIG. 2 includes, or is otherwise operable with, a control system 92. The control system 92 is operably connected to a plurality of sensors 102 for sensing data indicative of, e.g., one or more operating conditions of the turboshaft engine 50, ambient conditions, etc. Specifically, for the exemplary embodiment depicted, the plurality of sensors 102 includes an ambient condition sensor 102A, an LP component sensor 102B, and HP component sensor 102C, a fuel flow sensor 102D, and a turbine inlet sensor 102E. In certain exemplary embodiments, the ambient condition sensor 102A may sense data indicative of, e.g., an ambient temperature, and ambient pressure, and/or an airflow speed. Additionally, in certain embodiments, the LP component sensor 102B may sense data indicative of a e.g., a rotational speed of the LP shaft 74/LP compressor 60, a temperature or pressure within the LP compressor 60, etc. Similarly, the HP component sensor 102C may sense data indicative of, e.g., a rotational speed of the HP shaft 72/HP compressor 62, a temperature or pressure within the HP compressor 62, etc. Further, in certain embodiments, the fuel flow sensor 102D may sense data indicative of a fuel flowrate, or volume, to the combustion section 64 of the turboshaft engine 50. Further, the turbine inlet sensor 102E may sense, in certain exemplary embodiments, a turbine inlet temperature, a turbine inlet pressure, or both. As is depicted, each of the sensors 102 is operably connected to the control system 92 through a communication bus 104, such as wired or wireless communications busses. Specifically, for the embodiment depicted, the communication bus 104 is a wired communication bus, such that each of the sensors 102 is operably connected to the control system 92 through a plurality of communication wires 106.

Moreover, it should be appreciated, that the exemplary turboshaft engine 50 depicted in FIG. 2 is provided by way of example only, and that in other exemplary embodiments, the turboshaft engine 50 may have any other suitable configuration. For example, in certain exemplary embodiments, the turboshaft engine 50 may not include the LP compressor 60, and thus, the LP turbine 68 may only support rotation of the LP shaft 74 to provide rotational power to the load 90. Additionally, the turboshaft engine 50 may include various actuators, guide vanes, ports, etc. not described herein or depicted in FIG. 2. Further, in still other exemplary embodiments, the turboshaft engine 50 may instead be configured as any other suitable gas turbine engine incorporated into any other suitable aircraft, such as a fixed wing aircraft, or any other form of, e.g., land vehicle or marine vehicle. For example, in other exemplary embodiments, aspects of the present disclosure may be used in conjunction with, e.g., a turbofan engine, turboprop engine, turbocore engine, turbojet engine, etc.

Figure 3:
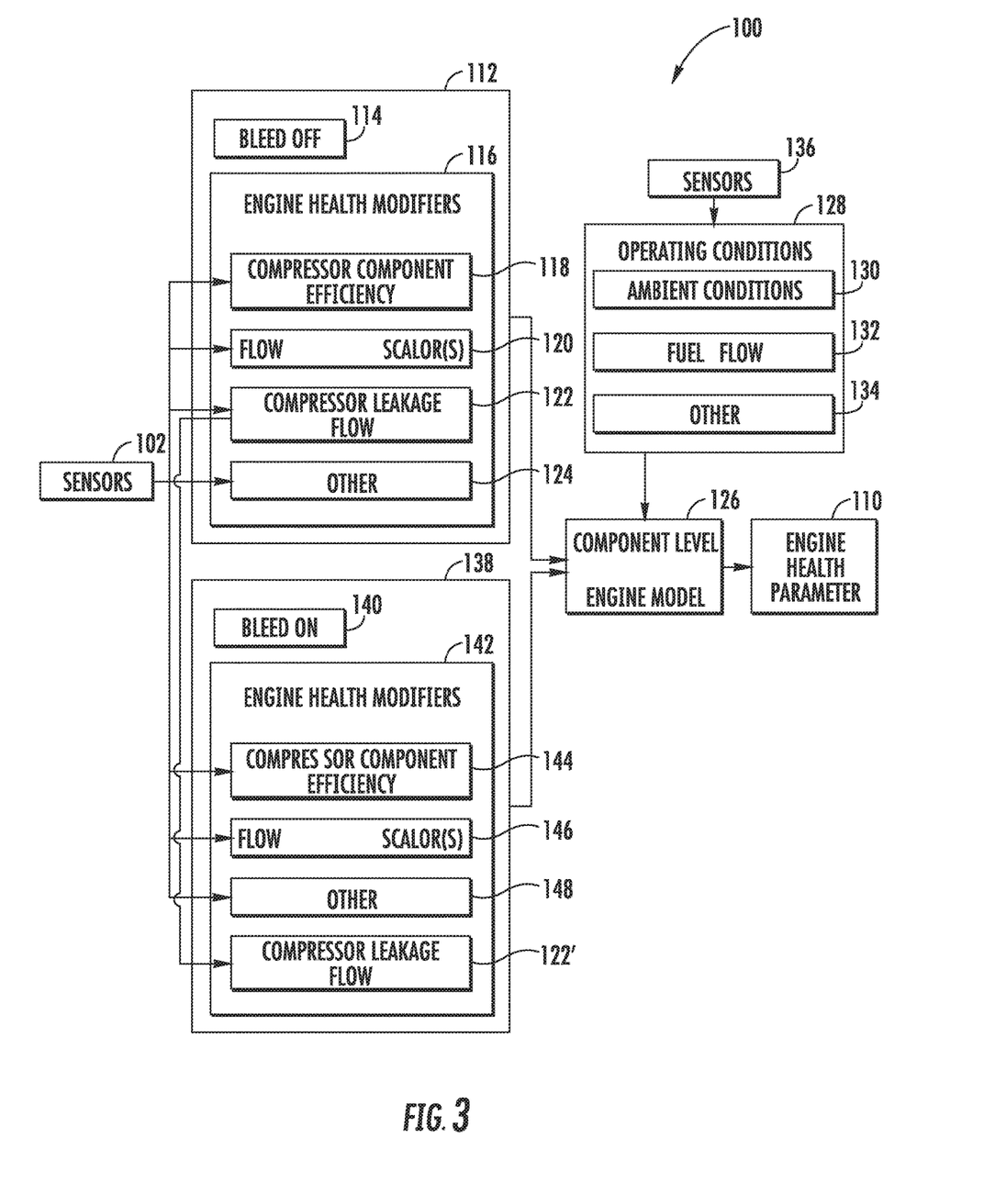
FIG. 3 is a schematic view of a control system in accordance with an exemplary aspect of the present disclosure.

Referring now to FIG. 3, a flow diagram is provided of a health monitoring system 100 (which may be incorporated into/executed by the exemplary control system 92 described above with reference to FIG. 2) in accordance with an exemplary aspect of the present disclosure. The exemplary health monitoring system 100 may be utilized with, e.g., the aircraft 10 of FIG. 1 and/or the gas turbine engine/turboshaft engine 50 of FIG. 2. However, in other exemplary aspects, the health monitoring system 100 of FIG. 3 may additionally, or alternatively, be utilized with any other suitable aircraft and/or gas turbine engine.

The exemplary health monitoring system 100 is generally configured to determine an engine health parameter 110 for a gas turbine engine, and convey such information to a user. For example, the engine health parameter 110 may be indicative of an amount of available torque for the gas turbine engine, or in other situations an amount of thrust available from the gas turbine engine. Accordingly, it will be appreciated that the engine health parameter 110 may, in certain exemplary aspects be an engine performance factor, such as an engine torque factor (e.g., a ratio of an available amount of torque to the maximum amount of torque for a no margin, sea level reference engine; commonly applicable to, e.g., turboshaft engines) or an engine thrust factor (e.g., a ratio of an available amount of thrust to the maximum amount of thrust for a no margin, sea level reference engine; commonly applicable to, e.g., turbofan engines and turboprop engines). Alternatively, however, the engine health parameter 110 may be, e.g., a maximum amount of power available for the engine.

The exemplary health monitoring system 100 generally includes a calibration module 112. The calibration module 112 may be performed periodically, such as at a time interval on the order of once a month. However, the calibration module 112 may additionally, or alternatively, be run at any other suitable time interval, or may be run periodically, e.g., on demand. The calibration module 112 generally includes a bleed off indicator submodule 114 configured for receiving an indication that the engine is operating in a bleed off condition, i.e., that an amount of compressor bleed airflow for use by the aircraft is substantially equal to zero. (Notably, there may be some compressor bleed airflow that is used by the engine during the "bleed off condition," but the amount of this compressor bleed airflow used by the engine may be known and factored in appropriately, e.g., as an engine operating condition, an engine health modifier, etc., as will be understood below.) Therefore, when the engine is operating in the bleed off condition, the engine is operating without bleed air being extracted from, or otherwise bled off from, the compressor section of the engine for use by the aircraft. The bleed off indicator submodule 114 may receive such an indication in response to an operator initiated calibration (i.e., pilot initiated) or system initiated calibration. The bleed off indicator submodule 114 receiving the indication that the engine is operating in the bleed off condition may trigger/initiate the operation of the calibration module 112. It will be appreciated that the calibration module 112 may be run at any desired location, such as on the ground in between flights, or any other suitable time wherein the engine is running and capable of being operated at least temporarily without bleed air for aircraft use.

The calibration module 112 additionally includes an engine health modifier submodule 116. The engine health modifier submodule 116 is configured to determine a first engine health modifier value, or more specifically, for the aspect depicted, a first plurality of engine health modifier values. For the embodiment shown, the engine health modifier values include a compressor component efficiency value 118, flow scaler value(s) 120, a compressor leakage flow value 122, and, optionally, other health modifier value(s) 124. It will be appreciated that the engine health modifier submodule 116 may determine these engine health modifier values 118-124 using, or otherwise based on, data received from, e.g., one or more sensors 102. The one or more sensors 102 may be configured in the same manner as the exemplary sensors 102 described above with reference to FIG. 2.

Notably, for the embodiment depicted, the calibration module 112 is configured to provide such engine health modifier values determined through the engine health modifier submodule 116 to an engine model of the health monitoring system 100, which for the aspect depicted is a component level engine model 126. The component level engine model 126 is referred to as such as each of the components within the engine is individually modeled and then assembled into a specific engine model, such as a physics-based engine model. For example, when the health monitoring system 100 is utilized with the exemplary turboshaft engine 50 of FIG. 2, the component level engine model 126 may include individual models for, e.g., the LP compressor 60, the HP compressor 62, the combustion section 64, the HP turbine 66, and the LP turbine 68, each combined/assembled into a single model for such engine.

The component level engine model 126 may be programmed to represent an engine cycle that accounts for various parameters, such as flight conditions, control variable inputs, and engine health modifier values, such parameter values determined by the engine health modifier submodule 116. Further, the component level engine model 126 may receive these parameter values and use these parameter values to adjust or "tune" itself to more accurately reflect the specific engine, such that the component level engine model 126 may relatively accurately simulate the behavior of the particular engine, taking into account the effects of manufacturing variations between engines, engine deterioration, ambient conditions, and/or damaged engine parts.

Accordingly, referring still to FIG. 3, the component level engine model 126 is configured to receive data from the engine health modifier submodule 116 indicative of the various parameter values determined thereby to tune the component level engine model 126. Additionally, the component level engine model 126 is configured to receive data indicative of various operating conditions of the engine it is modeling. More specifically, the health monitoring system 100 further includes an operating condition module 128 configured to determine data indicative of various operating conditions of the engine, and more specifically still, for the embodiment depicted, ambient condition values 130 (such as ambient temperature, ambient pressure, and/or ambient humidity), fuel flow values 132 (e.g., fuel flow to the combustion section of the engine), and optionally other parameter values 134. These operating parameter values 130-134 may be determined by the operating condition module 128 based on, or otherwise utilizing, data received indicative of the operating conditions from, e.g., one or more sensors 136. For example, in certain embodiments, the other parameter values 134 may include, e.g., other control inputs such as variable guide vane positions, an amount of bleed airflow used by the engine (i.e., bleed airflow other than bleed airflow extracted for use by the aircraft), etc. Further, the other parameter values 134 may include aircraft interface data, such as power extraction, power turbine shaft speed (NP), etc.

Using the engine health modifier values provided by the engine health modifier submodule 116 of the calibration module 112 and operating parameter values received from the operating condition module 128, the component level engine model 126 may determine an engine health parameter 110, which as stated above, may be indicative of available amount of torque available for the engine, such as an engine torque factor, during this bleed off operating condition/calibration.

It will be appreciated, however, from the discussion below, that in other exemplary embodiments, the calibration module 108 may, in other exemplary aspects, simply determine the compressor leakage flow value 122 during the bleed off operating condition, and save such value 122 for later use.

Referring still to FIG. 3, the exemplary health monitoring system 100 depicted further includes an engine health tracking module 138 configured to provide the engine model 126 with data, such that the engine model 126 may, in turn, provide the user with the engine health parameter 110 during other operating conditions of the engine, wherein the amount of compressor bleed airflow for use by the aircraft is unknown. For example, the engine health tracking module 138 of the health monitoring system 100 may be configured to operate during, e.g., flight operating conditions of the engine, or any other operating condition of the engine wherein the amount of compressor bleed airflow for use by the aircraft is unknown. Notably, the engine health tracking module 138 includes a bleed on submodule 140. The bleed on submodule 140 may indicate to the health monitoring system 100 that the amount of bleed airflow for use by the aircraft from the engine is a non-zero number, or otherwise an unknown value.

It will be appreciated that during these flight operating conditions, the engine health tracking module 138 may not have actual data of amount of compressor bleed airflow for use by the aircraft, which is typically taken into account in an engine model using a current compressor leakage flow value to tune the model. For example, previous control systems have included bleed sensors for directly sensing an amount of bleed airflow from the compressor section of the engine extracted for use by the aircraft. However, as will be explained below, the present control system may omit any such direct bleed sensors, and associated hardware. Accordingly, it will be appreciated that with the present health monitoring system 100, the health monitoring system 100 is not aware of the amount of compressor bleed airflow.

Further, it will be appreciated that the health monitoring system 100 and engine health tracking module 138 may not simply assume a "zero" value for the compressor leakage flow when determining the engine health parameter 110, which may be, e.g., an engine torque factor (even though if the engine were pushed to provide its maximum torque, a bleed valve controlling the amount of bleed airflow may be closed such that the amount of bleed airflow would substantially be zero). More specifically, the compressor leakage flow modifier for the engine model 126 accounts not only for an actual amount of airflow being bled off of the compressor section, but also for an amount of deterioration of the engine. For example, the compressor leakage flow parameter includes a portion attributable to the actual amount of compressor bleed airflow, as well as a portion attributable to engine deterioration. For example, the engine deterioration may be, e.g., worn-down seals within the compressor, worn-down or fatigued components, etc., which would have a similar effect as compressor bleed to the engine model 126.

Accordingly, it will be appreciated that the calibration module 112 is configured to save the compressor leakage flow value 122 determined, for the exemplary aspect depicted, by the engine health modifier submodule 116 of the calibration module 112, as it is known during the operation of the calibration module 112 that the amount of compressor bleed airflow is equal to zero (and thus the portion of the compressor leakage flow parameter attributable to compressor bleed airflow is equal to zero). The compressor leakage flow value 122 determined therein is therefore attributable solely to the deterioration of the engine.

In such a manner, the health monitoring system 100 may determine the engine health parameter 110 indicative of a maximum amount of torque available for the engine during operation of the engine without having current bleed data. More specifically, the engine health tracking module 138 similarly includes an engine health modifier submodule 142 configured to determine a plurality of engine health modifier values during operation of the engine. The engine health modifier values include, for the exemplary aspect depicted, a compressor component efficiency value 144, flow scaler value(s) 146, and optionally other engine health modifier value(s) 148. Each of these parameter values 144-148 may be determined by the engine health modifier submodule 142 of the engine health tracking module 138 based on, or otherwise utilizing, current/real-time data of the engine, and more specifically, based on, or otherwise utilizing, real-time data sensed by one or more sensors 102 of the engine.

By contrast, however, the engine health modifier submodule 142 does not use a current compressor leakage flow value, and instead "virtually shuts off" the compressor bleed airflow by utilizing the saved compressor leakage flow value 122 determined by the engine health modifier submodule 116 of the calibration module 112 (indicated as compressor leakage flow value 122' in FIG. 3). Thus, the engine health modifier submodule 142 accounts for the deterioration component of the compressor leakage flow modifier, without having to know the current amount of compressor bleed airflow of the engine.

Similar to as discussed above, the engine health modifier submodule of the engine health tracking module 138 may provide these engine health modifier values to the component level engine model 126. The component level engine model 126 may, based on these engine health modifier values from the engine health modifier submodule 142 of the engine health tracking module 138, and up to date operating condition parameter values of the engine from the operating condition module 128, may determine an updated/real-time engine health parameter 110, and provide the updated/real-time engine health parameter 110 to, e.g., a user. Notably, the engine health tracking module 138 may operate substantially continuously during a flight, such that a user is provided updated engine health parameter 110 data throughout the flight, or at any suitable interval which may be useful for maintenance and/or mission planning.

Such a health monitoring system 100 may provide for a less expensive and simpler way to determine engine health parameter 110 data, or more specifically, available torque, for an engine during operation, without requiring separate bleed airflow sensors (or bleed airflow sensors for an amount of bleed air extracted for use by the aircraft), bleed models, etc.

Figure 4:
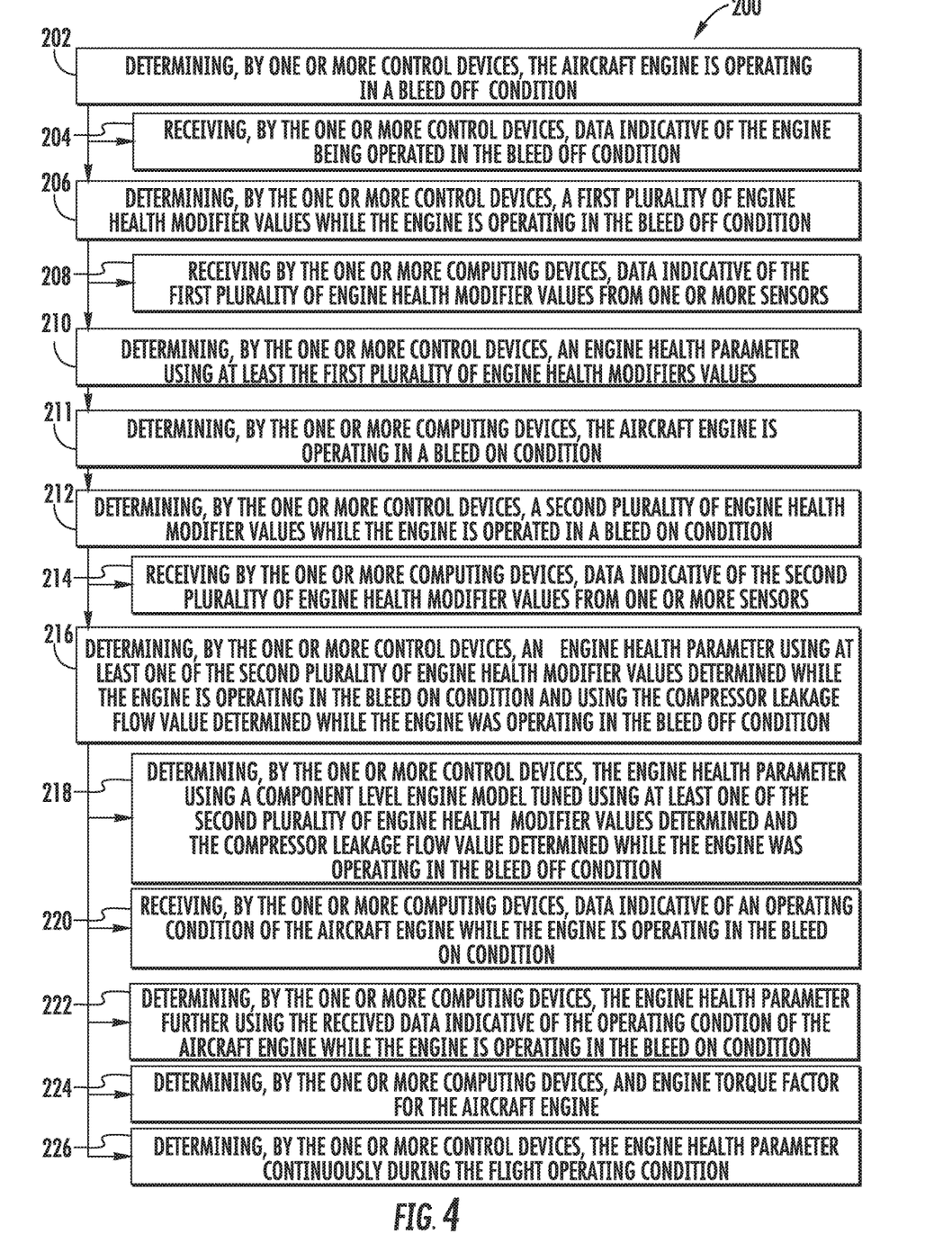
FIG. 4 is a flow diagram of a method for determining an engine health in accordance with an exemplary aspect of the present disclosure.

Referring now to FIG. 4, a flow diagram is provided of a method 200 for determining an engine health of an aircraft engine in accordance with an exemplary aspect of the present disclosure. Notably, the method 200 of FIG. 4 may utilize the health monitoring system 100 described above with reference FIG. 3, may be operable with the exemplary turboshaft engine 50 described above with reference to FIG. 2, and/or may further be operable with the exemplary aircraft 10 described above with reference to FIG. 1. Additionally, the method 200 may be implemented using any suitable control device, such as the exemplary control system 300 of FIG. 6.

The exemplary method 200 generally includes at (202) determining, by one or more control devices, the aircraft engine is operating in a bleed off condition. Determining, by the one or more control devices, the engine is operating in the bleed off condition at (202) includes at (204) receiving, by the one or more control devices, data indicative of the engine being operated in the bleed off condition. For example, the data may be received from a user of the aircraft engine, such as an aircraft pilot, or from one or more control systems of the aircraft engine or aircraft.

The method 200 further includes determining, by the one or more control devices, a first engine health modifier value while the engine is operating in the bleed off condition (such as a compressor leakage flow value). More specifically, for the exemplary aspect depicted, the method 200 includes at (206) determining, by the one or more control devices, a first plurality of engine health modifier values while the engine is operating in the bleed off condition. For the exemplary aspect depicted, determining, by the one or more computing devices, the first plurality of engine health modifier values while the engine is operating in the bleed off condition at (206) includes at (208) receiving, by the one or more computing devices, data indicative of the first plurality of engine health modifier values from one or more sensors. Accordingly, the data received at (208), and therefore, the first plurality of engine health modifier values determined at (206), may be based on current engine operating conditions.

Notably, for the exemplary aspect depicted, the first plurality of engine health modifier values includes a compressor leakage flow value, and additionally includes a first compressor component efficiency value and a first compressor flow scaler value. However, in other exemplary aspects, the engine health modifier value(s) may simply be the compressor leakage flow value.

Further, at (210) the exemplary method 200 includes determining, by the one or more control devices, an engine health parameter using at least the first plurality of engine health modifier values. As will be appreciated from the exemplary aspect described above with reference to FIG. 3, in at least certain exemplary aspects, determining the engine health parameter at (210) may additionally include determining the engine health parameter based on one or more current operating conditions of the aircraft engine, and further may include determining the engine health parameter using a component level engine model of the aircraft engine.

Referring still to the exemplary aspect of FIG. 4, the method 200 additionally includes at (211) determining, by the one or more computing devices, the aircraft engine is operating in a bleed on condition, and at (212) determining, by the one or more control devices, a second plurality of engine health modifier values while the engine is operated in a bleed on condition. Accordingly, it will be appreciated that determining, by the one or more computing devices, the second plurality of engine health modifier values at (212) takes place at a time subsequent to aspects (202) through (210) of the exemplary method 200 described above.

For the exemplary aspect depicted, determining, by the one or more computing devices, the second plurality of engine health modifier values while the engine is operating in the bleed on condition at (212) includes at (214) receiving by the one or more computing devices, data indicative of one or more of the second plurality of engine health modifier values from one or more sensors. Accordingly, the data received at (214), and therefore, one or more of the second plurality of engine health modifier values determined at (212), may be based on current engine operating conditions.

Notably, for the exemplary aspect depicted, the second plurality of engine health modifier values includes a second compressor component efficiency value and a second compressor flow scaler value. For the exemplary aspect depicted the second plurality of engine health modifier values does not include an up-to-date, or current, compressor leakage flow value, as is described in more detail below.

Further, the exemplary aspect of the method 200 depicted includes at (216) determining, by the one or more control devices, an engine health parameter using at least 1 of the second plurality of engine health modifier values determined while the engine is operating in the bleed on condition at (212) and using the compressor leakage flow value determined while the engine was operating in the bleed off condition at (206).

More specifically, for the exemplary aspect depicted, determining, by the one or more control devices, the engine health parameter at (216) additionally includes at (218) determining, by the one or more control devices, the engine health parameter using a component level engine model tuned using at least one of the second plurality of engine health modifier values determined at (212) and the compressor leakage flow value determined while the engine was operating in the bleed off condition at (206). Accordingly, in at least certain exemplary aspects, determining, by the one or more control devices, the engine health parameter at (218) may further include determining, by the one or more control devices, the engine health parameter using the component level engine model tuned using the second compressor component efficiency value, the second compressor flow scaler value, and the compressor leakage flow value determined while the engine was operating in the bleed off condition at (206).

Further, referring still to the exemplary aspect of FIG. 4, for the exemplary aspect depicted, determining, by the one or more computing devices, the engine health parameter at (216) further includes at (220) receiving, by the one or more computing devices, data indicative of an operating condition of the aircraft engine while the engine is operating in the bleed on condition, and further at (222) determining, by the one or more computing devices, the engine health parameter further using the received data indicative of the operating condition of the aircraft engine while the engine is operating in the bleed on condition at (220). (See also health monitoring system 100 of FIG. 3, wherein the component level engine model receives current operating condition data and engine health modifier data to determine the engine health parameter.) Notably, in at least certain exemplary aspects, the data indicative of the operating condition of the aircraft engine may include data indicative of a fuel flow to a combustion section of the aircraft engine, data indicative of ambient conditions of the aircraft engine (e.g., ambient temperature, ambient pressure, ambient humidity, etc.), or both.

Moreover, for the example aspect depicted, determining, by the one or more computing devices, the engine health parameter at (216) also includes at (224) determining, by the one or more computing devices, an engine performance factor for the aircraft engine. The engine performance factor determined at (224) may be an engine torque factor to indicate to, e.g., a user or control system a maximum available amount of torque available from the aircraft engine, or an engine thrust factor to indicate to, e.g., a user or control system a maximum amount of thrust available from the aircraft engine.

Further, it will be appreciated that with such an exemplary aspect, the method 200 may be utilized to provide substantially continuous information to a user, such as a pilot, of the aircraft and aircraft engine during flight operations of the aircraft and aircraft engine. More specifically, for the exemplary aspect depicted, the bleed on condition is a flight operating condition of the aircraft engine, and determining, by the one or more control devices, the engine health parameter at (216) includes at (226) determining, by the one or more control devices, the engine health parameter continuously during the flight operating condition. Notably, as used herein, the term "continuously, with respect to the determining the engine health parameter may refer to continuously at a frequency of at least once per 30 minutes, at least once per 15 minutes, at least once per 10 minutes, etc. In such a manner, the method 200 may be utilized to provide a user of the aircraft and aircraft engine with a substantially up-to-date engine health parameter value.

Figure 5:
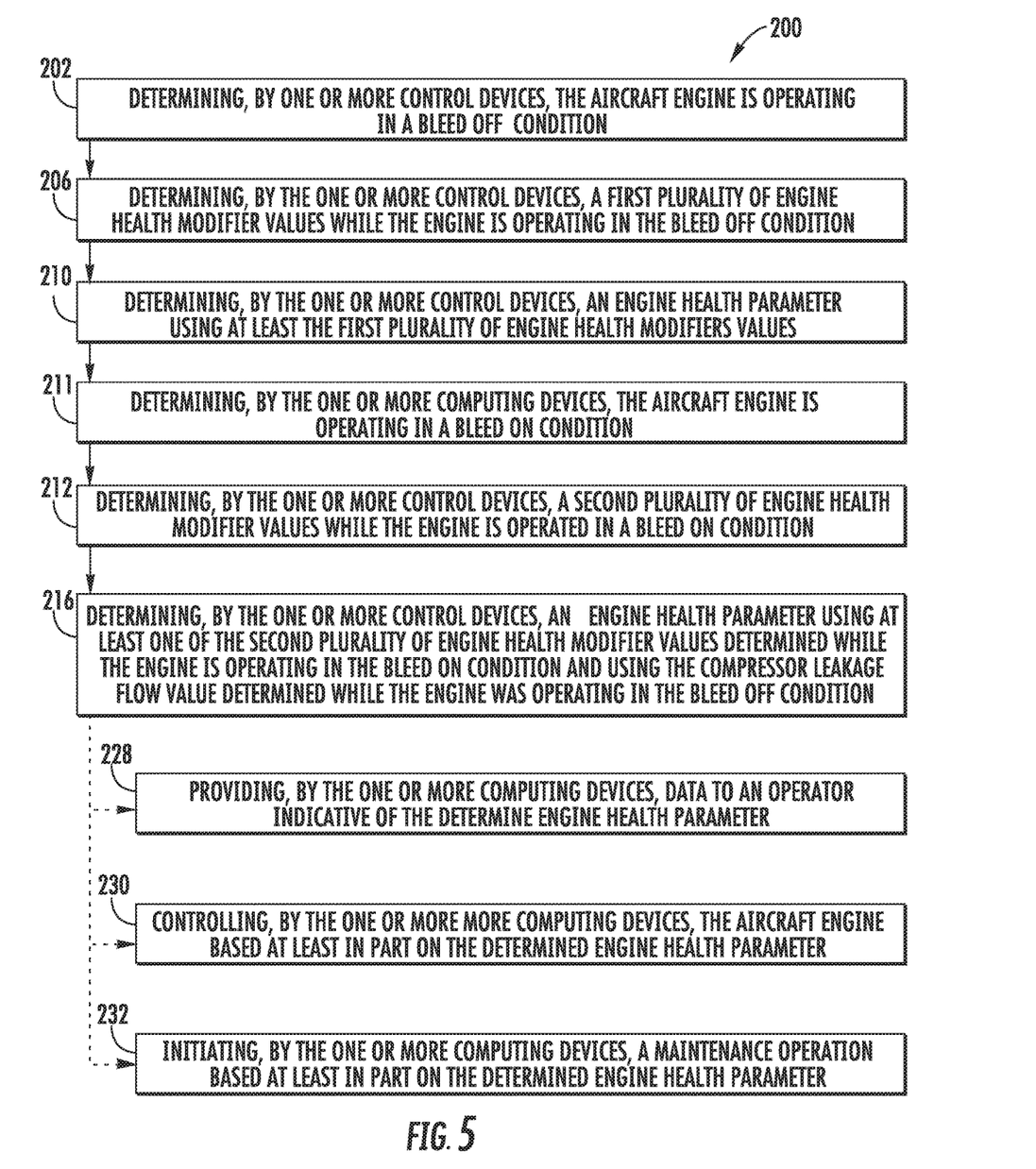
FIG. 5 is a flow diagram of a method for determining an engine health in accordance with another exemplary aspect of the present disclosure.

Moreover, referring now briefly to FIG. 5, providing a flow diagram of another method 200 for determining an engine heath of an aircraft engine, it will be appreciated that in certain exemplary aspects of the present disclosure, the engine health parameter may be used, e.g., during the operation of the aircraft engine.

As is depicted, the exemplary method 200 of FIG. 5 may be configured in substantially the same manner as the exemplary method 200 of FIG. 4. For example, the exemplary method 200 of FIG. 5 includes the exemplary aspects denoted at (202), (206), (210), (211), (212), and (216) in FIG. 4.

Additionally, the method 200 of FIG. 5 optionally includes at (228) providing, by the one or more computing devices, data to an operator indicative of the determined engine health parameter. Providing, by the one or more computing devices, data to an operator indicative of the determined engine health parameter at (228) may include providing the data indicative of the determined engine health parameter to a pilot of the aircraft including the aircraft engine.

Additionally, the method 200 of FIG. 5 optionally includes at (230) controlling, by the one or more computing devices, the aircraft engine based at least in part on the determined engine health parameter. For example, controlling, by the one or more computing devices, the aircraft engine based at least in part on the determined engine health parameter at (230) may include increasing or decreasing a power demand on the aircraft engine based on the determined engine health parameter, determining a flight decision based on the determined engine health parameter, etc.

Additionally, still, the method 200 of FIG. 5 optionally includes at (232) initiating, by the one or more computing devices, a maintenance operation based at least in part on the determined engine health parameter. For example, initiating, by the one or more computing devices, the maintenance operation based at least in part on the determined engine health parameter at (230) may include scheduling a maintenance operating.

Figure 6:
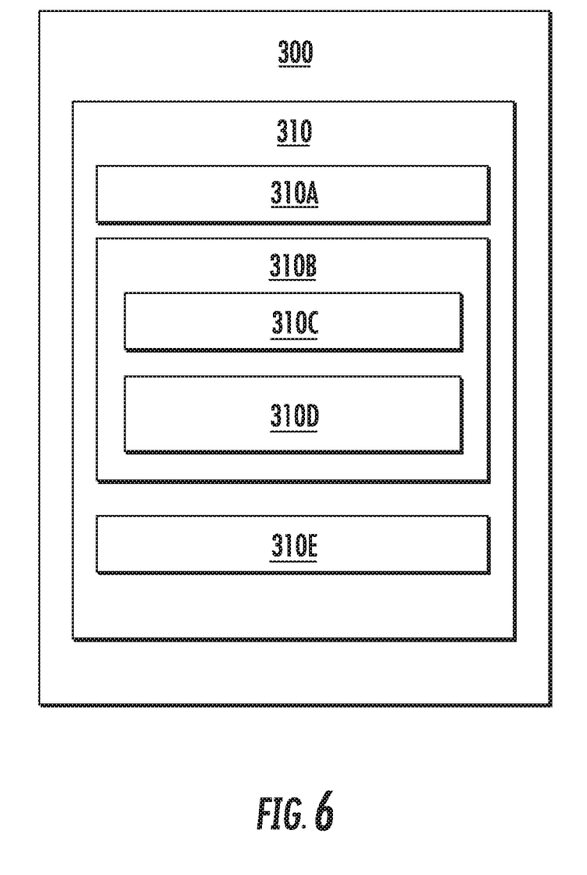
FIG. 6 is a schematic diagram of a system in accordance with an exemplary embodiment of the present disclosure.

Referring now to FIG. 6, an example computing system 300 according to example embodiments of the present disclosure is depicted. The computing system 300 can be used, for example, as a control system 92 for an aircraft engine including a health monitoring system 100, and/or to execute a method for determining an engine health of an aircraft engine, such as the exemplary method 200 described above. The computing system 300 can include one or more control devices, also referred to as computing device(s) 310. The computing device(s) 310 can include one or more processor(s) 310A and one or more memory device(s) 310B. The one or more processor(s) 310A can include any suitable processing device, such as a microprocessor, microcontroller, integrated circuit, logic device, and/or other suitable processing device. The one or more memory device(s) 310B can include one or more computer-readable media, including, but not limited to, non-transitory computer-readable media, RAM, ROM, hard drives, flash drives, and/or other memory devices.

The one or more memory device(s) 310B can store information accessible by the one or more processor(s) 310A, including computer-readable instructions 310C that can be executed by the one or more processor(s) 310A. The instructions 310C can be any set of instructions that when executed by the one or more processor(s) 310A, cause the one or more processor(s) 310A to perform operations. In some embodiments, the instructions 310C can be executed by the one or more processor(s) 310A to cause the one or more processor(s) 310A to perform operations, such as any of the operations and functions for which the computing system 300 and/or the computing device(s) 310 are configured, the operations described with the health monitoring system 100 of FIG. 3, the operations for determining an engine health of an aircraft engine (e.g., method 200), as described herein, and/or any other operations or functions of the one or more computing device(s) 310. The instructions 310C can be software written in any suitable programming language or can be implemented in hardware. Additionally, and/or alternatively, the instructions 310C can be executed in logically and/or virtually separate threads on processor(s) 310A. The memory device(s) 310B can further store data 310D that can be accessed by the processor(s) 310A. For example, the data 310D can include data indicative of periods engine health modifier values, operating condition values, and/or any other data and/or information described herein.

The computing device(s) 310 can also include a network interface 310E used to communicate, for example, with the other components of system 300 (e.g., via a network). The network interface 310E can include any suitable components for interfacing with one or more network(s), including for example, transmitters, receivers, ports, controllers, antennas, and/or other suitable components. One or more external display devices (not depicted) can be configured to receive one or more commands from the computing device(s) 310.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for determining an engine heath of an aircraft engine comprising:
    determining, by one or more control devices, the aircraft engine is operating in a bleed off condition;
    determining, by the one or more control devices, a first engine health modifier value while the aircraft engine is operating in the bleed off condition, the first of engine health modifier value including a compressor leakage flow value;
    determining, by the one or more control devices, a second plurality of engine health modifier values while the aircraft engine is operating in a bleed on condition; and
    determining, by the one or more control devices, an engine health parameter using at least one of the second plurality of engine health modifier values determined while the aircraft engine is operating in the bleed on condition and the compressor leakage flow value determined while the aircraft engine was operating in the bleed off condition.

2. The method of claim 1, wherein determining, by the one or more control devices, the engine health parameter comprises determining, by the one or more control devices, the engine health parameter using a component level engine model tuned using at least one of the second plurality of engine health modifier values and the compressor leakage flow value determined while the aircraft engine was operating in the bleed off condition.

3. The method of claim 1, wherein determining, by the one or more control devices, the first engine health modifier value comprises receiving, by the one or more control devices, data indicative of the first engine health modifier value from one or more sensors.

4. The method of claim 1, wherein determining, by the one or more control devices, the second plurality of engine health modifier values comprises receiving, by the one or more control devices, data indicative of the second plurality of engine health modifier values from one or more sensors.

5. The method of claim 1, wherein the first engine health modifier value is one of a first plurality of engine health modifier values, and wherein the first plurality of engine health modifier values additionally includes a first compressor component efficiency value and a first compressor flow scaler value.

6. The method of claim 1, wherein the second plurality of engine health modifier values includes a second compressor component efficiency value and a second compressor flow scaler value.

7. The method of claim 6, wherein determining, by the one or more control devices, the engine health parameter comprises determining, by the one or more control devices, the engine health parameter using the second compressor component efficiency value, the second compressor flow scaler value, and the compressor leakage flow value determined while the aircraft engine was operating in the bleed off condition.

8. The method of claim 1, wherein the bleed on condition is a flight operating condition of the aircraft engine.

9. The method of claim 8, wherein determining, by the one or more control devices, the engine health parameter comprises determining, by the one or more control devices, the engine health parameter continuously during the flight operating condition.

10. The method of claim 1, wherein determining, by the one or more computing devices, the engine health parameter comprises determining, by the one or more computing devices, an engine performance factor for the aircraft engine.

11. The method of claim 1, wherein determining, by the one or more computing devices, the engine health parameter further comprises:
    receiving, by the one or more computing devices, data indicative of an operating condition of the aircraft engine while the aircraft engine is operating in the bleed on condition; and
    determining, by the one or more computing devices, the engine health parameter further using the received data indicative of the operating condition of the aircraft engine while the aircraft engine is operating in the bleed on condition.

12. The method of claim 11, wherein the data indicative of the operating condition of the aircraft engine includes data indicative of a fuel flow to a combustion section of the aircraft engine, data indicative of one or more ambient conditions of the aircraft engine, or both.

13. The method of claim 1, further comprising:
    determining, by the one or more computing devices, the aircraft engine is operating in the bleed on condition.

14. The method of claim 1, wherein the aircraft engine is a turboshaft engine for a helicopter.

15. The method of claim 1, further comprising:
    providing, by the one or more computing devices, data to an operator indicative of the determined engine health parameter.

16. The method of claim 1, further comprising:
    controlling, by the one or more computing devices, the aircraft engine based at least in part on the determined engine health parameter.

17. A computing device comprising a one or more processors and at least one tangible non-transitory computer-readable medium, the computer-readable medium storing instructions that when executed by the processor perform operations, the operations comprising:
    determining the aircraft engine is operating in a bleed off condition;
    determining a first engine health modifier value while the aircraft engine is operating in the bleed off condition, the first of engine health modifier value including a compressor leakage flow value;
    determining a second plurality of engine health modifier values while the aircraft engine is operating in a bleed on condition; and
    determining an engine health parameter using at least one of the second plurality of engine health modifier values determined while the aircraft engine is operating in the bleed on condition and the compressor leakage flow value determined while the aircraft engine was operating in the bleed off condition.

18. The computing device of claim 17, wherein determining the engine health parameter comprises determining the engine health parameter using a component level engine model tuned using at least one of the second plurality of engine health modifier values and the compressor leakage flow value determined while the aircraft engine was operating in the bleed off condition.

19. The computing device of claim 17, wherein determining the first engine health modifier value comprises receiving data indicative of the first engine health modifier value from one or more sensors.

20. The computing device of claim 17, wherein determining the second plurality of engine health modifier values comprises receiving data indicative of the second plurality of engine health modifier values from one or more sensors.

* * * * *